United States Patent [19]

Kirkbride

[11] 4,144,189

[45] Mar. 13, 1979

[54] PROCESS FOR REGENERATING SPENT CRACKING CATALYST

[76] Inventor: Chalmer G. Kirkbride, 13 Elk Forest, R.D. #2, Elkton, Md. 21921

[21] Appl. No.: 896,004

[22] Filed: Apr. 13, 1978

[51] Int. Cl.² .................. B01J 29/38; B01J 21/20; C10G 11/04; B01J 1/10

[52] U.S. Cl. .................. 252/414; 204/162 R; 208/113; 208/120; 252/411 R

[58] Field of Search .......... 252/411 R, 414; 208/68, 208/113, 120; 204/162 R, 162 HE

[56] References Cited

U.S. PATENT DOCUMENTS

| | | | |
|---|---|---|---|
| 2,317,494 | 4/1943 | Thomas | 208/68 |
| 2,367,474 | 1/1945 | Stewart | 252/411 R |
| 3,291,719 | 12/1966 | Dill | 252/411 R |
| 3,412,013 | 4/1968 | Bowles | 252/411 R |
| 3,449,213 | 6/1969 | Knapp et al. | 201/19 |
| 3,503,865 | 3/1970 | Stone | 204/162 R |

Primary Examiner—Patrick Garvin
Assistant Examiner—P. E. Konopka
Attorney, Agent, or Firm—Dann, Dorfman, Herrell & Skillman

[57] ABSTRACT

A process for regenerating spent cracking catalyst, especially spent fluid cracking catalyst, is provided, which includes subjecting a mixture of spent cracking catalyst particles and hydrogen to wave energy in the microwave range.

13 Claims, 1 Drawing Figure

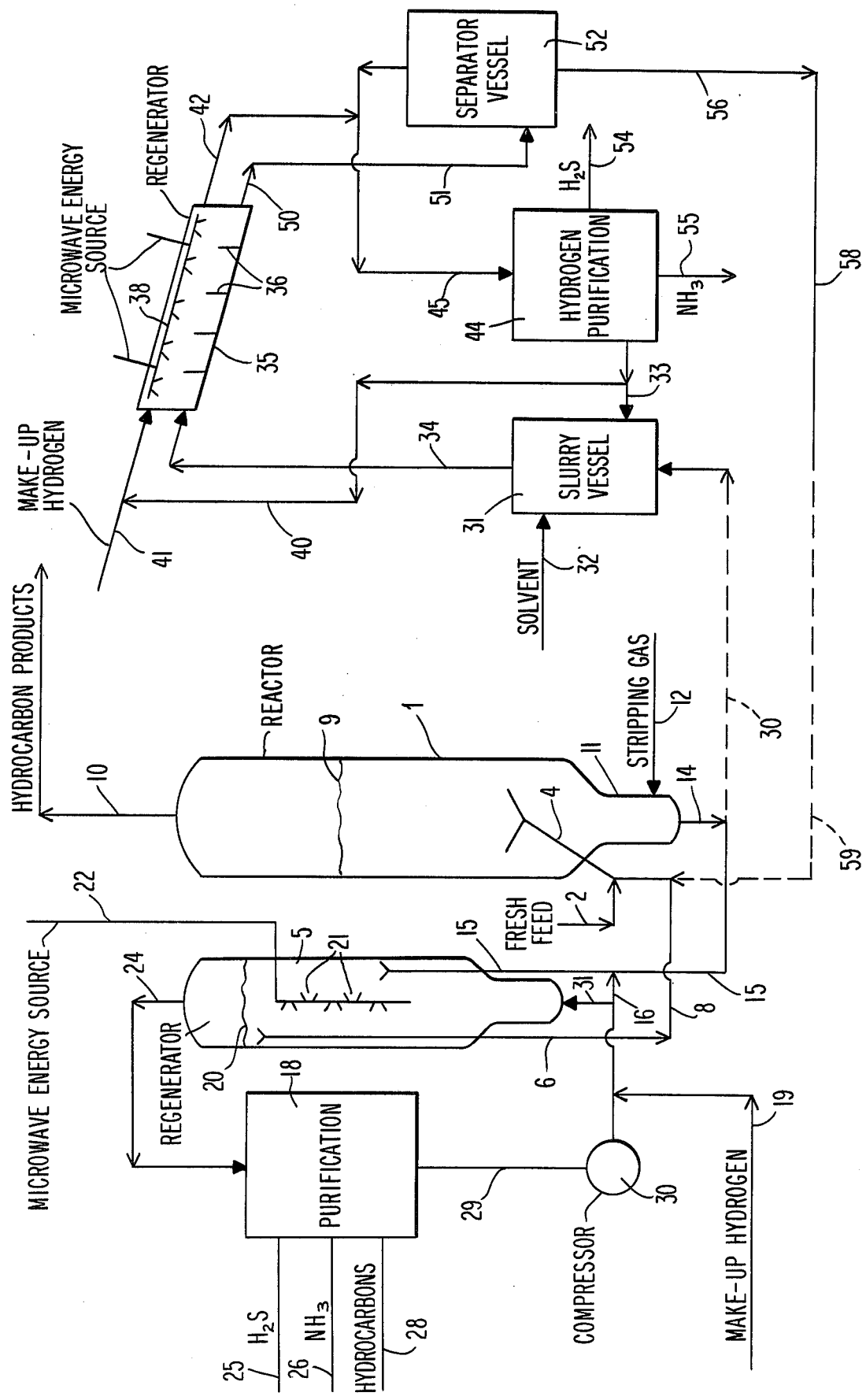

PROCESS FOR REGENERATING SPENT CRACKING CATALYST

BACKGROUND OF THE INVENTION

My patent application Ser. No. 831,170, filed Sept. 7, 1977 for "Sulfur Removal from Coal" is directed to reducing the sulfur content of coal by drying coal particles and subjecting a mixture thereof with hydrogen to microwave energy. My patent application Ser. No. 831,171, also filed Sept. 7, 1977, for "Shale Conversion Process," is directed to converting the kerogen of shale to oil products by drying the shale and subjecting a mixture thereof and hydrogen to microwave energy. My patent application Ser. No. 896,003, filed Apr. 13, 1978 for "Process for Removing Sulfur from Coal," is directed to reducing the sulfur content of coal by forming a slurry of coal particles in an inert solvent, and subjecting the slurry in admixture with hydrogen to the influence of wave energy in the microwave range.

The present invention relates to a process for regenerating spend solid particles which have been deactivated in a process for cracking petroleum hydrocarbons, usually petroleum fractions boiling above about 400° F., say within the range of from about 500° F. to about 1100° F., in a fluidized cracking process. In fluid catalytic cracking, a charge stock is contacted with a fluidized catalyst under conditions such that the charge stock is converted at least in part to lower boiling, more valuable products, usually gasoline, fuel oil, and the like. In the cracking process, the catalyst becomes deactivated through the deposition of carbonaceous materials on the surface thereof. Such carbonaceous materials, designated "coke," are highly condensed aromatic materials containing some hydrogen and sulfur and nitrogen compounds, believed in a total amount of from about 0.5 to 1.5% by weight, which amount deactivates the catalyst so that regeneration becomes economically desirable. For convenience this deactivating material is referred to herein simply as "coke." It is normal practice to include in the cracking procedure a regeneration step for burning deactivating coke from the catalyst. Usually a stream of catalyst is removed from the reactor, stripped to remove at least a portion of the volatile hydrocarbons, and is introduced into a regenerator together with air, which burns a major portion of the coke to oxides of carbon. The regenerated catalyst is then reintroduced into the reactor.

Many catalytic cracking units are limited by coke burning facilities, since the construction of the regeneration section of the cracking unit represents a major part of the capital cost. Thus, any increase over normal coke formation which may be experienced, such as may be caused by basic nitrogenous compounds in the feed, metal contamination of the catalyst, or any formation of a coke more refractory, i.e., more resistant to burning than expected, may require that the feed rate introduction be reduced significantly. Also, the practice of burning the coke with air in effect is a loss of valuable petroleum hydrocarbons to oxides of carbon.

An object of the present invention is to provide a novel process for regenerating spent cracking catalyst in a facile and economical manner.

A specific object of this invention is to provide a process for removing coke from cracking catalyst in which the coke is converted to valuable products.

Another object is to reduce the time required for regenerating cracking catalyst, i.e., to reduce the residence time of the catalyst in a regeneration vessel, whereby the capital cost of the regenerator section of a cracking unit can be reduced.

In an embodiment of the invention, deactivated fluid cracking catalyst is passed from the cracking reactor to the regenerator as is common practice, except that hydrogen is introduced with the catalyst particles instead of air, and the catalyst particles fluidized with hydrogen are subjected to energy in the microwave range. The coke is converted to volatile products and removed with the hydrogen, and regenerated catalyst is returned to the reactor.

In another embodiment of the invention, deactivated catalyst is removed from the reactor, admixed with a solvent which serves as the liquid medium to form a slurry, and the slurry containing dissolved hydrogen is subjected to energy in the microwave range. The deactivating coke is converted to products soluble in or miscible with the solvent, and regenerated catalyst is separated and returned to the reactor, or the slurry containing reactivated catalyst can be introduced into the reactor where the solvent is an appropriate feed stock to the catalytic reactor.

The accompanying Figure is a schematic flow diagram illustrating preferred embodiments of the process of the invention and will be described in detail hereinafter.

DETAILED DESCRIPTION OF THE INVENTION

Catalysts which can be regenerated by the present process are those used in the fluidized cracking of petroleum hydrocarbons. The preparation and use of cracking catalysts are well known, siliceous cracking catalysts, including naturally occurring clays which have been activated and synthetically prepared composits have long been used. Siliceous catalyst generally include one or more other components, and silica-alumina, silica-zirconia, silica-magnesia, silica-alumina-beryllia, etc. illustrate such catalysts. Zeolites in a silica-alumina matrix give excellent results. For use in the fluid process, the catalyst particles are in the form of a powder, generally of a size range of from about 20 to 150 microns. Cracking catalyst compositions and their preparation do not form part of the present invention.

In a typical fluidized operation, hot regenerated catalyst particles are lifted through a conduit into the reaction bed by vaporization of the feedstock, also introduced into the conduit and vaporized as it meets hot catalyst. Reaction occurs in the conduit carrying the catalyst and feedstock to the reactor. Reaction also occurs in the reactor, which further serves as a separator of catalyst dust and of gaseous reaction products, Coke-laden catalyst, which may have about 0.5% by weight coke, and sometimes as high as 27%, is stripped of volatile oil as it descends to what is called a dense phase, usually with steam, after which it passes into a conduit into which air is injected so that, now in what is called the fluidized phase, the catalyst enters the regenerator where the coke by burning with the oxygen of the air is largely converted to oxides of carbon which are removed as gases from the regenerator. The regenerated hot catalyst is then recirculated to the reactor, being introduced together with feedstock. In the process of the present invention this process is drastically changed. Instead of introducing air and deactivated catalyst into the regenerator, hydrogen is substituted for air, and a source of microwave energy is positioned so that the mixture of hydrogen and deactivated catalyst is subjected to the influence of the microwaves. As has been found, the coke is largely converted to hydrocarbons, probably by a combination of cracking, depolymerization and hydrogenation, including both low boiling hydrocarbons but primarily high boiling hydrocarbons. The low boiling hydrocarbons can be recovered from the gaseous effluent as valuable hydrocarbons and further used. The regenerated catalyst is recirculated to the cracking reactor. The higher boiling hydrocarbons formed from this coke are usually in the vapor phase and are so removed, but can be permitted to remain with the catalyst and reintroduced into the reactor where they serve as feedstock, but generally this is quite minor as a factor in the process. In this embodiment, it may be advantageous to strip oil from the spent catalyst with a gas other than steam, as the presence of substantial moisture in the regenerator is not desired. Hydrogen or methane is preferably used as the stripping medium, especially when the cracking reaction is carried out in the presence of hydrogen. Other gases can be used, such as nitrogen or flue gas. During the catalyst regeneration, the sulfur and nitrogen compounds of the coke are converted to volatile compounds such as hydrogen sulfide and ammonia, respectively, and are removed from the process with the hydrocarbons and can be separated therefrom by known means.

In another embodiment of the invention, spent catalyst as above described is removed from the reactor with or without stripping. The spent catalyst particles are admixed with an inert solvent to form a slurry, and the slurry containing dissolved hydrogen is subjected to microwaves. The coke appears to be converted to hydrocarbons miscible with or soluble in the solvent, probably by a combination of cracking, depolymerization, and hydrogenation. The regenerated catalyst may then be separated and recycled to the reactor, but preferably the entire slurry is introduced into the reactor so that the solvent containing products from the coke cracking-hydrogenation serves as feedstock. By "solvent," as used herein, is a liquid medium and is preferably a petroleum distillate having a boiling range within the range of from about 400° F. to 700° F. and is a suitable component of feedstock to the catalytic cracker. The "solvent" is the liquid part of the slurry, serves to dissolve hydrogen, and in some cases may be the feedstock to the cracking reaction. Unsaturated components of the solvent may, during the catalyst regeneration, be hydrogenated in part to more saturated materials, and this may improve the value of the solvent as a feedstock to the reactor. Sulfur and nitrogen compounds as components of the materials forming coke are converted so that the sulfur appears as volatile compounds such as hydrogen sulfide and ammonia, and are removed from the process.

The wave energy to use in the present process is in the microwave range and may be from 1 megacycle per second to 1000 gigacycles per second ($10^6$ to $10^{12}$ cycles per second, respectively). These frequencies may be expressed using the Hertz (Hz) Unit, and are the same as from 1 megahertz (1 MHz) to 1000 gigahertz (1000 GHz). As used herein, "megacycles" means "megacycles per second" unless otherwise stated. With some catalysts it may be advantageous to use two or three or even more frequencies simultaneously or consecutively, as this may be the most efficient operation. While again it is not desired to be limited by theoretical considerations, it is believed that a single frequency may not give optimum activation of all possible sites in the coke activated by microwaves, such as may be in the polynuclear aromatics, or the sulfur and nitrogen sites, or the sites of metallic atoms, which may be in the coke as impurities. Optimum activation thereof is believed to rapidly initiate the depolymerization, cracking, and hydrogenation processes, in the presence of hydrogen, according to the present invention. The desirability of using a multiplicity of wave energy sources and the frequencies to use are best determined by experimentation for a given charge stock to the cracker, as variations in the coke compositions cannot be predicted. The equipment for generating microwaves is well known to those skilled in the art. Continuous wave magnetrons with accompanying electronic equipment gives good results, and the choice and use of such equipment will be apparent to those skilled in the art.

The accompanying FIGURE is a schematic diagram in the form of a flow sheet illustrating preferred embodiments of the process of the invention. Fresh feedstock which is composed of petroleum straight run fractions and recycle gas oil, both boiling above the gasoline boiling range, is introduced into reactor 1 through conduits 2 and 4. In conduit 4 the feedstock is admixed with catalyst from regenerator 5 through lines 6, 8 and 4. This catalyst is sufficiently hot (about 1050° F.) to vaporize the feedstock in line 4, and the mixture is fluidized as it enters reactor 1. In line 4 and in the fluidized bed having poorly defined level 9, the cracking reactions occur and the products are shown leaving reactor 1 through line 10. Coke-laden deactivated catalyst descends into the constricted bottom portion 11 of reactor 1, and a stripping gas introduced through line 12 removes most of the volatile material from the catalyst. As stated above, steam is often the stripping gas, but hydrogen is advantageously used in the present process, especially where the cracking reactions are carried out in an atmosphere of hydrogen. Stripped catalyst particles leave stripping zone 11 through line 14, are admixed in line 15 with hydrogen which is introduced through line 16, the hydrogen being from hydrogen purification zone 18 or from fresh hydrogen storage (not shown) through line 19. A heater (not shown) for the hydrogen is advantageously used to control the temperature in the regenerator and therefore to insure that the temperature of the regenerated catalyst is sufficient to carry out the cracking reaction. The catalyst in regenerator 5 fluidized with hydrogen has ill-defined surface 20. The catalyst-hydrogen mixture is subjected to microwaves as shown at 21 from power source (not shown) through line 22. In the presence of hydrogen and under the influence of microwaves, the deactivating carbonaceous material, herein designated "coke" for convenience, is converted to hydrocarbons which are gaseous under the conditions employed and are removed from regenerator 5 through line 24 and passed to purification zone 18. The temperature of the regeneration zone when burning coke with air is usually about 950° to 1200° F., and significantly higher temperatures are avoided as leading to possible catalyst damage. While the same temperature can be used in the present process, a lower overall regenerator temperature also gives good results, say from about 700° F. to 950° F. While the action of the microwaves and the hydrogenation reaction may be sufficient to maintain this temperature, external means such as a furnace or heat exchanger, which may be as described above for the hydrogen stream, usually will be needed to maintain the desired temperature. This is of importance in recycling regenerated catalyst which must be hot enough to vaporize feedstock and supply heat the cracking reaction. While it is not desired to be limited by theoretical considerations, it is believed the microwaves activate sites within the coke and at the coke-catalyst border, including the sites of sulfur and nitrogen atoms, and of fused aromatic nucleus, which localized temperature at such sites, resulting in depolymerization and cracking in the presence of hydrogen to form gaseous hydrocarbons, hydrogen sulfide and ammonia. As shown in the Figure, hydrogen is purified in zone 18 by known means, and hydrogen sulfide and ammonia are shown leaving zone 18 via lines 25 and 26, respectively. Hydrocarbons are recovered through line 28 for further use in the refinery. Purified hydrogen is recycled from zone 18 through line 29, compressor 30 and line 31 to the generator and line 16 to admix the deactivated catalyst. A particular advantage of this embodiment is the short residence time of catalyst in the regenerator. Whereas from about 4 to 8 minutes is normally employed when regenerating by burning with air, a much shorter residence time is used in the present process. A residence time of from 15 seconds to 3 minutes, and preferably from 30 seconds to 2 minutes, gives good results. These advantageous results permit smaller regenerator vessels and therefore decreases the capital cost. Also, regenerators of very simple design can be used. For example, a conduit, preferably a pipe, fitted with a microwave source so that a stream of catalyst and hydrogen flowing through the pipe are subjected to microwaves, with provision for removing hyodrgen sulfide, ammonia and hydrogen, purifying hydrogen, and recovering hydrocarbon products from the coke, gives good results. Other reactor designs will be apparent to those skilled in the cracking art and will be operable so long as deactivated fluid cracking catalyst particles in admixture with hydrogen is subjected to wave energy in the microwave range, and reactivated catalyst is reused in the cracking process.

Another embodiment of the invention shown in the Figure is separated from the above-described embodiment by dotted lines 30 and 59. In this embodiment deactivated cracking catalyst which may or may not be stripped of volatile materials is removed from reactor 1 through line 14 and dotted line 30, and is passed to slurry vessel 31. A solvent which is advantageously a petroleum distillate as herein described and which is suitable as feedstock to the cracker is introduced into slurry vessel 31 via line 32, and mixing is supplied to form a slurry of the catalyst in the solvent. Hydrogen is introduced into slurry vessel 31 via line 33 to dissolve in the solvent, provide a hydrogen atmosphere, and where desired, may be used as agitation means to form or assist in forming the catalyst-solvent slurry. The slurry passes through line 34 to regenerator 35, which is an elongated vessel container weirs 36 and microwave source 38. The catalyst-slurry containing dissolved hydrogen passes over weirs 36 during exposure to microwaves from source 38. This arrangement permits all catalyst particles to be exposed to microwaves where the waves must pass for at least part of the time through only a small depth of solvent, say about 0.1 to 1 inch, and the maximum depth of passage through the solvent is from about 0.5 to 2 feet. The temperature in the regenerator can be ambient, but preferably is about 400° F. but below the boiling point of the solvent at the pressure used. The action of the microwaves causes local temperature rises at certain sites during activation as discussed below, but the overall temperature rise of the flowing mass is small because of the relatively small amount of coke present in weight percent. Where a relatively high boiling solvent is used and is subsequently passed to the cracker as feedstock, temperatures in the upper portion of the range, say from 200° F. to 400° F., lower the viscosity of the solvent which aids the process, but as the same time decreases the amount of hydrogen dissolved in the solvent which is disadvantageous and may require an increase in residence time in the regenerator, or an increase in the regenerator pressure. The average residence time of catalyst particles in vessel 35 is short, and times of from 10 seconds to 2 minutes give good results, although up to 10 minutes can be used to advantage in some instances. On occasion the microwave source may become coated with a film of solvent, or with a buildup of a slight amount of decomposition products as may be present or caused by the microwaves, which prevents effective operation due to reflection of the microwaves so they do not leave the tube source. It has been found that by sweeping the space between the microwave source and the slurry surface with a fast flowing stream of gaseous hydrogen, the formation of a film over the microwave source is prevented. Thus, hydrogen is introduced into regenerator 35 through line 40 or 41, and this hydrogen also serves as make-up hydrogen when required. The hydrogen stream sweeps through regenerator 35 at a rate of from about one linear foot to five linear feet per second, exits through line 42 and goes to hydrogen purification zone 44 through line 45. The catalyst-solvent slurry leaves regenerator 25 via lines 50 and 51 and passes into separation vessel 52. In regenerator 35 the sulfur and nitrogen of the complex coke materials are converted to hydrogen sulfide and ammonia, which pass dissolved in the slurry to vessel 52 with the slurry, or enter in the gas phase in reactor 35 and pass with hydrogen through lines 42 and 45 to hydrogen purification 44. The carbonaceous materials forming the coke appear to be converted by cracking and/or depolymerization in the presence of dissolved hydrogen to hydrocarbons soluble in or miscible with the solvent, and remain therewith through lines 50 and 51 into vessel 52. Generally there is no need to remove these materials from the solvent and they become components thereof. Should in a given instance such materials prove of significant different physical properties and detrimental to the solvent, they can be removed by purification means as may be appropriate, such as distillation (not shown) and further used in the refinery. In separation vessel 52 hydrogen and gaseous products are removed via line 45 and hydrogen purified in vessel 44. Hydrogen sulfide and ammonia are removed from vessel 44 through lines 54 and 55 respectively. Where necessary, gaseous hydrocarbons if formed in regenerator 35 can also be removed from vessel 44 (not shown) and recovered for refinery use. The slurry of regenerated catalyst and solvent exit from vessel 52 through lines 56 and 58, and pass through dotted line 59 into the feedstock-catalyst line 4 going into reactor 1. Where the solvent is not a suitable feedstock, or where for any reason it is desired to operate with the solvent in a substantially closed cycle, catalyst particles are separated and returned to the reactor, and hydrocarbons formed in regenerator 35 are separated therefrom and used as desired, and the solvent is recycled (not shown). The great advantage of this latter embodiment is that the regenerator 35 can be maintained at substantially higher pressure than reactor 1. This large difference in pressure is achieved easily by pumping under pressure slurry from slurry vessel 31 through line 34 to regenerator 35.

The Figure does not show the usual valves, pumps, heat exchangers, control means, and the like, the use of which is within the scope of those skilled in the art.

EXAMPLE 1

A commercially available crystalline aluminosilicate zeolite fluid cracking catalyst, spent in a process for cracking petroleum hydrocarbons, is disengaged from hydrocarbon reaction vapors, steam stripped, and passed through a transfer line to an elongated regeneration vessel. The spent catalyst contains about 1.2 wt.% coke. In the regeneration chamber the catalyst is maintained in a fluidized condition having a density of about 18 pounds per cubic foot by the introduction of hydrogen into the bottom of the regenerator. The regeneration vessel is fitted with a microwave source having a frequency of 300 gigacycles per second. The residence time in the regeneration vessel is sufficient so that the catalyst particles have an average exposure time to the microwaves of about 30 seconds. The temperature in the regenerator during exposure to microwaves is maintained at about 900° F. using an external oil fired furnace as necessary. Regenerated catalyst is removed from the regeneration vessel and contains about 0.15 wt.% coke and has substantially the same activity as is obtained through regeneration by burning the coke to about the same level with oxygen. Effluent gases are removed from the top of the regeneration vessel consisting of unreacted hydrogen, hydrogen sulfide, ammonia, 0.02 pounds of light hydrocarbons including propane and butane and 0.07 pounds of heavy hydrocarbons per pound of fresh feed to the cracker. The hydrocarbons can be removed from hydrogen by any desired means with purified hydrogen being recycled to the process and the hydrocarbons being further used in the refinery.

EXAMPLE 2

A gas oil from Mid-Continent petroleum boiling from about 550° F. to 1,000° F. is cracked in a fluidized process having an average cracking temperature of 1,010° F. Feed to the reactor is about 28,000 barrels per day of the gas oil and a commercially available crystalline aluminosilicate zeolite catalyst having an average particle size of about 50 microns is circulated at the rate of about 15 tons per minute. Spent catalyst containing about 1.1 wt.% coke is removed from the vessel after steam stripping and is admixed with an inert solvent or reaction medium which is a petroleum distillate boiling within the range of from about 420° F. to about 550° F. The catalyst-solvent slurry is initially prepared by mechanical mixing. The slurry is then admixed with hydrogen and passed to a vertically elongated regenerator equipped with a microwave source. The slurry is maintained under an atmosphere of hydrogen at a slightly elevated pressure of about 10 pounds psig in the regenerator. The linear velocity of the slurry through the regenerator is about 30 feet per minute and the catalyst particles in the slurry are exposed to the microwaves for about one minute. The microwave source is operated at 300 gigacycles per second. The temperature is ambient and a slight rise in temperature in the regenerator of from 70° F. to 85° F. is observed. The slurry effluent from the reactor is heated by passing through a heat exchanger to a temperature of about 180° F. to remove dissolved gases, and the resulting slurry is returned, after further heating and mixing with feedstock, to the cracking zone so that the solvent serves as part of the feedstock to the cracking process. The regenerated catalyst in the slurry has an activity slightly above the equilibrium activity of the catalyst in the reaction zone. Gases from the regenerator recovered both from the gaseous atmosphere in the regenerator and dissolved in the slurry contain hydrogen sulfide, ammonia, 0.06 pounds of heavy hydrocarbons (liquid under atmospheric pressures and temperatures), and a realtively small amount of gaseous hydrocarbons; most of the hydrocarbon products from the regeneration process remain dissolved in the solvent and are returned therewith to the cracking zone.

What is claimed is:

1. Process for regenerating deactivated cracking catalyst which has become deactivated in a hydrocarbon cracking process which comprises subjecting a mixture of deactivated cracking catalyst and hydrogen to microwave energy at a temperature of from 700° F. to 950° F. for a time of not more than ten minutes, and reusing the regenerated catalyst in said hydrocarbon cracking process.

2. Process according to claim 1 wherein the cracking catalyst has become deactivated in a fluidized cracking process for petroleum hydrocarbons.

3. Process for regenerating fluidized cracking catalyst deactivated by coke formed in a hydrocarbon cracking operation which comprises fluidizing the deactivated catalyst with hydrogen and subjecting the fluidized catalyst-hydrogen mixture to microwave energy at a temperature of from 700° F. to 950° F. for a time of not more than ten minutes, and reusing the reactivated catalyst having a reduced coke content in said cracking operation.

4. Process according to claim 3 wherein the microwave energy is from about 1 to about 1,000,000 megacycles per second.

5. Process according to claim 4 wherein hydrocarbons are recovered from the regenerator.

6. Process for regenerating fluidized cracking catalyst deactivated by coke formed in a hydrocarbon cracking operation which comprises forming a slurry of the catalyst particles and a solvent containing dissolved hydrogen and subjecting the slurry to microwave energy wherein said solvent is a petroleum distillate and the subjecting of the slurry to microwave energy is performed at a temperature of from 200° F. to 400° F., and returning regenerated catalyst particles to said hydrocarbon cracking operation.

7. Process according to claim 6 wherein the microwave energy is from about 1 to about 1,000,000 megacycles per second.

8. Process for regenerating fluidized cracking catalyst deactivated by coke formed in a hydrocarbon cracking operation which comprises fluidizing the deactivated catalyst with hydrogen and subjecting the fluidized catalyst-hydrogen mixture to microwave energy wherein said microwave energy is composed of at least two different microwave frequencies, wherein the temperature is from 700° F. to 950° F. and the time of subjecting said mixture to microwave energy is from fifteen seconds to three minutes, and returning regenerated catalyst to said hydrocarbon cracking operation.

9. Process according to claim 8 wherein the fluidized catalyst-hydrogen mixture is subjected to at least two microwave frequencies simultaneously.

10. Process according to claim 8 wherein the fluidized catalyst-hydrogen mixture is subjected to at least two microwave frequencies consecutively.

11. Process for regenerating fluidized cracking catalyst deactivated by coke formed in a hydrocarbon cracking operation which comprises forming a slurry of the catalyst particles and a solvent containing dissolved hydrogen and subjecting the slurry to microwave energy wherein said microwave energy is composed of at least two different microwave frequencies, wherein said solvent is a petroleum distillate, the temperature is above 200° F. and below the boiling point of the solvent, and the time of exposure to said microwave energy is from ten seconds to ten minutes, and returning reactivated cracking catalyst to said hydrocarbon cracking operation.

12. Process according to claim 11 wherein the fluidized catalyst-hydrogen mixture is subjected to at least two microwave frequencies simultaneously.

13. Process according to claim 11 wherein the slurry is subjected to at least two microwave frequencies consecutively.

UNITED STATES PATENT AND TRADEMARK OFFICE
CERTIFICATE OF CORRECTION

PATENT NO.  : 4,144,189
DATED       : March 13, 1979
INVENTOR(S) : Chalmer G. Kirkbride It is certified that error appears in the above-identified patent and that said Letters Patent are hereby corrected as shown below:

Column 1, line 22, delete "spend solid particles" and substitute --spent solid catalyst particles--

Column 2, line 55, delete "27%" and substitute --2%--

Column 5, line 8, delete "which localized temperature" and substitute --which causes localized temperature increases--; line 18, delete "the" and substitute --with--

Column 6, line 9, delete "as" and substitute --at--

Signed and Sealed this

Second Day of October 1979

[SEAL]

Attest:

RUTH C. MASON
Attesting Officer

LUTRELLE F. PARKER
Acting Commissioner of Patents and Trademarks